(No Model.)
C. B. TITCOMB.
AIR PURIFYING AND VENTILATING APPARATUS FOR RAILWAY CARS.
No. 506,749.  Patented Oct. 17, 1893.
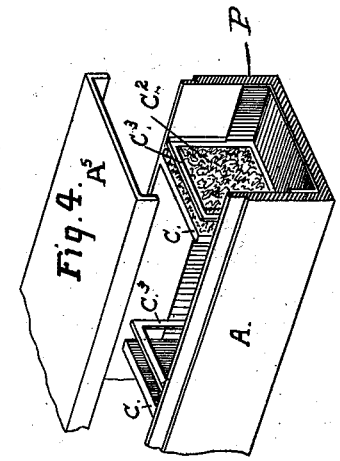
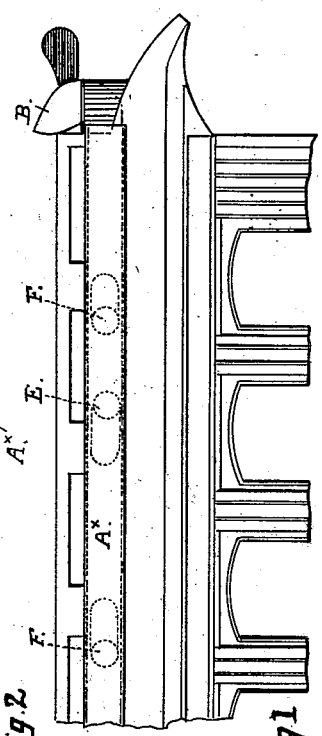
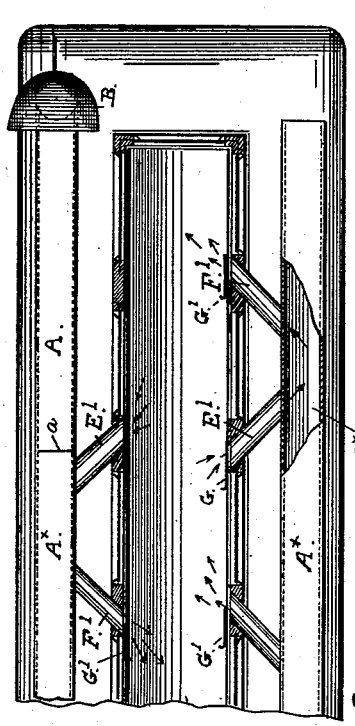
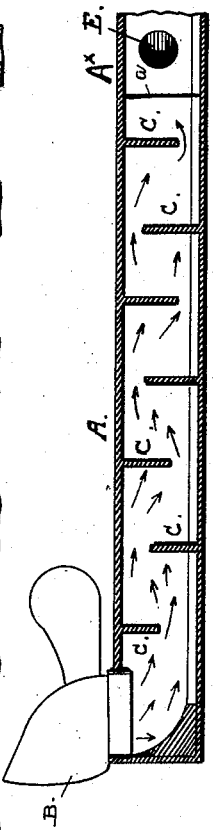
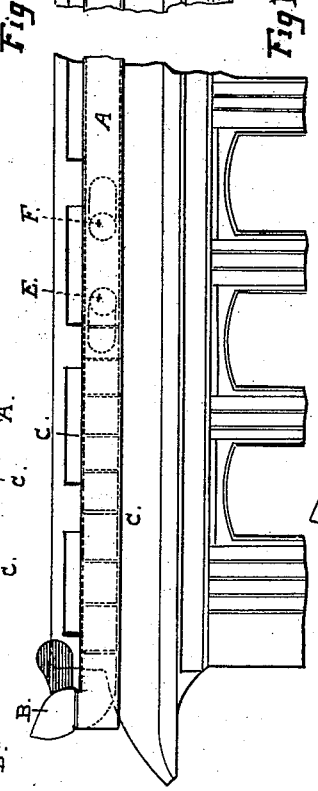
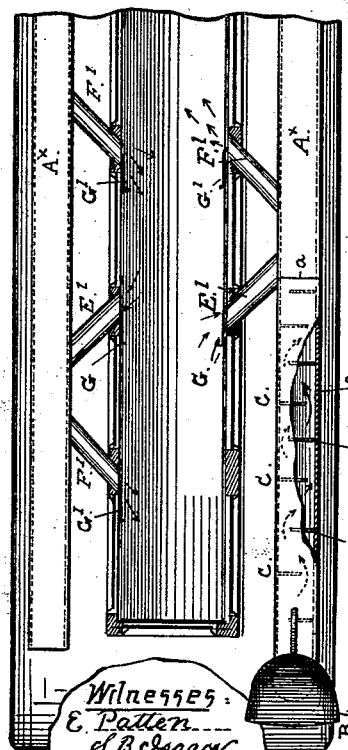
Witnesses
E. Patten
S. B. Isaacs
Inventor:
Charles B. Titcomb
By Dwight Osborn attys

UNITED STATES PATENT OFFICE.

CHARLES B. TITCOMB, OF SAN FRANCISCO, CALIFORNIA.

AIR-PURIFYING AND VENTILATING APPARATUS FOR RAILWAY-CARS.

SPECIFICATION forming part of Letters Patent No. 506,749, dated October 17, 1893.

Application filed January 14, 1892. Serial No. 418,097. (No model.)

*To all whom it may concern:*

Be it known that I, CHARLES B. TITCOMB, a citizen of the United States, residing in the city and county of San Francisco, State of California, have invented certain new and useful Improvements in Air-Purifying and Ventilating Apparatus for Railway-Cars, of which the following is a specification.

This invention relates to those ventilating devices which are specially devised for application to railway cars to supply fresh air to the atmosphere of the car in as nearly as possible a purified condition free from dust and cinders, and the invention comprises certain novel improvements in air purifying and ventilating devices consisting, mainly, of an air filtering or purifying trunk or conductor of novel construction which is adapted to extract or remove from moving air currents the particles of dust, cinders and other solid matter held in suspension and carried along in the air, and in combination with a filtering or purifying conductor a means of producing a circulation of the purified air currents through the atmosphere of the car consisting of inflow and outflow tubes or conductors of novel arrangement as hereinafter fully set forth.

The following description explains the nature of my said improvements and the manner in which I proceed to construct, apply and carry out the same, reference being had to the accompanying drawings which form part of this specification.

Referring to the said drawings by letter:—

Figure 1 represents in side elevation the roof and top part of a railway car having on its roof a ventilating apparatus constructed according to my invention. Fig. 2 is a plan or top view of Fig. 1 with the clear-story in section, and with portions of the filtering trunk or conductor broken away to show the internal construction. Fig. 3 is a top view on an enlarged scale of the filtering trunk in section at and near the inlet end. Fig. 4 shows in perspective a portion of the filtering trunk specially constructed to absorb fine dust and other solid particles from the air.

A is a trunk or tubular conductor with an opening at one end on which is fitted a funnel or hood B with a flaring mouth to catch and throw the air into the trunk. The hood should be made to revolve and should have a tail or rudder to present its mouth always to the wind or in the direction in which the car is traveling.

C C are baffle plates or deflectors projecting from the opposite sides or walls of the conductor across its interior space but not extending entirely across the space, so that a clear passage is left between the end of each plate and the opposite side or wall. I have termed these deflectors baffle plates and shall so designate them in this description because they are arranged across the general direction of the moving air currents to deflect and baffle the particles of solid matter which collect in the angles or corners at the junction of the plates with the walls of the conductor while the air currents are allowed to pass around them.

$A^\times$ is a tubular conductor either connected to the discharge-end $a$ of the purifying-trunk A or forming a continuation or an extension of that conductor for the remaining distance to the rear, or opposite end, along the car roof. E and F are openings along the side of the conductor $A^\times$ and E' F' are tubes or conductors forming passages to connect the openings E F before mentioned with the interior space of the car. In the present construction and application of my improvements these parts are arranged on the outside of the car on the roof and along the side of the clear-story with the tubes E' F' carried through the sides of the clear-story for the purpose of showing that the invention is applicable to cars already in use and to cars of the present style of construction. It will be evident, however, to the practical car-builder that these improvements contain no obstacle in the way of their being built or constructed in and as part of the car-body.

The filtering conductor can be built into the top part of the car at the side or under the roof and the openings E F arranged to deliver into the interior of the car under the clear-story instead of being carried from the outside through the sides of the clear-story. And in all cases of their application inside the car-body the position and arrangement of the filtering conductor and the inflow and outflow tubes will be governed by the general construction and style of the car and the amount of room available in the frame or body of the car. In some cases it will be necessary to build the conductors outside instead of taking space from the inside of the car, and in some cases sufficient room may be taken from the inside to throw the parts entirely within the frame or body of the car. The inflow and outflow tubes or passages are set at an angle with the general direction of the air-currents traveling through the main conductors, and the difference between the action or operation of one tube and that of the other is produced by setting one in the contrary direction to the other. The tubes E' are set therefore at the backward angle more or less acute with the general line of the current, while the tubes F' are inclined in the direction of the current. The former therefore act as outflow tubes, drawing the air from the inside of the car, while the latter constitute inflow tubes to deliver air from the trunk or conductors into the car, a continual circulation being maintained by this means between the moving air currents traveling through the main conductors and the air within the car.

G G' are dampers to control the inflow and outflow passages from the inside of the car, so that all the outflow passages may be closed except the one nearest the rear end of the car.

A construction of baffle plate with an absorbing surface is shown in Fig. 4 to be used either in connection with the plain surfaced solid baffle plate, or in place of them in special cases or under special conditions as where the outer air in localities through which the car travels is particularly foul, or contains considerable quantities of fine dust. The absorbent surface $C^2$ of these baffle plates is best formed of wool waste or cotton waste held in place by a tight frame $C^3$, removably held in place in any suitable manner. As these baffle plates, like the plain uncovered ones C before described, do not remove the solid particles from the air by a filtering or straining operation, the air-currents do not pass through the absorbing material and therefore the backing for each baffle plate may be a solid plate or board secured at one end against the side of the conductor and extending from that side partially across the passage. But the absorbing material should be temporarily attached to or held in place against the flat face of the baffle plate, so that it can be easily removed as often as it becomes foul. Access to the interior of the conducting passage is provided by making the top $A^5$ of the conductor removable and by that means the passage can be cleaned out and the absorbing material can be taken out and replaced by new material whenever necessary. In some cases the absorbing material is kept moist by setting the lower portion of the baffle plate in a body of water on the bottom of the conductor and for that purpose, a shallow pan or trough for water is formed by lining the bottom of the conductor where it is made of wood, or having its seams or joints suitably water-tight where the conductor is made of metal.

The use of the moist surfaces over the baffle plates will be found beneficial where it is desired to reduce the temperature of the air-currents, and will increase the efficiency of the surfaces as dust collectors. The two styles of baffle plates C and $C^2$ can be employed in the same trunk to advantage in some cases, particularly where the air holds considerable quantities of cinders or larger particles as well as fine dust, the plain baffle plates C being set nearest the inlet and the covered ones $C^2$ being placed next to the discharge-end of the purifying trunk. Two of these purifying trunks and their circulating pipes should be placed on each car in reverse positions, as represented in Figs. 1 and 2 that there may be the end of one purifying passage presented to the front at all times in the run of the car whatever may be the position of the car in the train.

Having thus fully described my invention, what I claim, and desire to secure by Letters Patent, is—

1. In a ventilating device for railway cars, the combination with an air purifying trunk mounted longitudinally upon the car top alongside the clear story thereof and having a funnel at its inlet end, and baffle plates projecting from the side walls of said trunk nearly across the same and arranged in alternate order; of a tubular conductor connected with and extending from the rear end of said trunk, inflow and outflow tubes leading from the side of said conductor into the clear story and standing at opposite oblique angles with each other, and dampers at the inner ends of said tubes, as and for the purpose set forth.

2. In a ventilating device for railway cars, the combination with an air purifying trunk mounted longitudinally upon a car top alongside the clear story thereof and having a funnel at its inlet end, and baffle plates projecting from the side walls of said trunk nearly across the same and arranged in alternate order; of a tubular conductor connected with and extending from the rear end of said trunk, and inflow and outflow tubes connecting said conductor with the interior of the car, as and for the purpose set forth.

3. In a ventilating device for railway cars, the combination with a trunk mounted longitudinally on a car body and having a funnel at its inlet end, a tubular conductor leading from its other end, and tubes connecting said conductor with the interior of the car; of baffle plates within said trunk and extending alternately from the side walls thereof nearly to the opposite walls, each baffle plate comprising a solid plate, an absorbent material placed against its front face, and a frame detachably clamping such material in position, as and for the purpose set forth.

4. In a ventilating device for railway cars, the combination with a trunk mounted longitudinally on a car body and having a funnel at its inlet end, a tubular conductor leading from its other end, tubes connecting said conductor with the interior of the car, and a removable cover for said trunk; of baffle plates within said trunk and extending alternately from the side walls thereof nearly to the opposite walls, absorbent material connected with the faces of certain of said plates, and a shallow water trough at the bottom of the trunk and in which the boards and material rest, as and for the purpose set forth.

5. In a ventilating device for railway cars, the combination with a trunk mounted longitudinally on a car body and having a funnel at its inlet end, a tubular conductor leading from its other end, and tubes connecting said conductor with the interior of the car; of baffle plates within said trunk and extending alternately from the side walls thereof nearly to the opposite walls, each baffle plate comprising a solid plate, an absorbent material placed against its front face, and a frame detachably clamping such material in position, and a shallow water-trough at the bottom of the trunk and in which the plates, frames, and material rest, as and for the purpose set forth.

In testimony that I claim the foregoing I have hereunto set my hand and seal.

CHAS. B. TITCOMB. [L. S.]

Witnesses:
C. W. M. SMITH,
CHAS. T. STANLEY.